United States Patent [19]
Godwin

[11] 4,158,788
[45] Jun. 19, 1979

[54] SPECIAL MOTOR WINDINGS FOR THE SUPPRESSION OF A SPECIFIC HARMONIC BY EXPANDING THE ELECTRICAL ANGLE OF PHASE BELTS

[75] Inventor: Gurney L. Godwin, Georgetown, Tex.

[73] Assignee: Westinghouse Electric Corp., Pittsburgh, Pa.

[21] Appl. No.: 837,231

[22] Filed: Sep. 27, 1977

[51] Int. Cl.² .................................................. H02K 3/00
[52] U.S. Cl. ............................................ 310/198; 318/773
[58] Field of Search ................................. 310/198–208, 310/180, 184, 185; 318/224 R

[56] References Cited

U.S. PATENT DOCUMENTS

| | | | |
|---|---|---|---|
| 3,175,142 | 3/1965 | Rawcliffe | 310/198 |
| 3,175,144 | 3/1965 | Rawcliffe | 310/198 |
| 3,450,971 | 6/1969 | Rawcliffe | 310/198 |
| 3,794,870 | 2/1974 | Broadway | 310/208 |
| 4,013,909 | 3/1977 | Broadway | 310/198 |
| 4,028,572 | 6/1977 | Baltisburger | 310/201 |

OTHER PUBLICATIONS

Rawcliffe & Fong, "Speed-Changing Induction Motors;" IEE Paper No. 3306v; 12/60.

*Primary Examiner*—R. Skudy
*Attorney, Agent, or Firm*—G. H. Telfer

[57] ABSTRACT

A pole amplitude modulated dynamoelectric machine having a specific harmonic suppressed by expanding the electrical angle of the phase belts as well as the method for doing the same is disclosed.

9 Claims, 14 Drawing Figures

SPECIAL MOTOR WINDINGS FOR THE SUPPRESSION OF A SPECIFIC HARMONIC BY EXPANDING THE ELECTRICAL ANGLE OF PHASE BELTS

BRIEF DESCRIPTION OF THE PRIOR ART AND SUMMARY OF THE INVENTION

This invention relates to three phase alternating current, speed-changing, dynamoelectric machines in which speed changing is effected by the method of pole amplitude modulation, (PAM) in which phase belt expansion is used on the machine's windings for the suppression of a specific harmonic.

The method of speed changing by pole amplitude modulation has been described in papers by G. H. Rawcliffe and others, the first entitled "Induction Motor Speed Changing By Pole Amplitude Modulation" in The Proceedings of the Institution of Electrical Engineers, Vol. 105, Part A, No. 22, August 1958 and a second entitled "Speed Changing Induction Motors— Further Developments In Pole Amplitude Modulation" in the Proceedings of The Institution of Electrical Engineers, Vol. 107, Part A, No. 36, December 1960.

The method has been further described and defined in U.S. Pat. Nos. 3,197,686; 3,175,141; 3,175,142; 3,175,143; 3,175,144; 3,233,159; 3,299,337; 3,450,971; 3,673,477; 3,794,870; 4,013,909; and 4,028,572.

The object of the present invention is to provide machines of the PAM type in which a specific MMF harmonic content is reduced by the use of phase belt expansion.

Experience has shown that some dynamoelectric machines' windings have an undesirable harmonic component that produces noise, vibration and/or a large torque cusp. Pole amplitude modulation (PAM) machines are very susceptible to these problems because of the additional demands made upon their windings. Disclosed herein is a method of reducing a specific harmonic by varying the electrical angle of the phase belts with only a minor reduction in the winding content of the main wave and thus improving the overall performance of the machine.

Windings are normally designed to give maximum winding factors for the main wave without consideration for the harmonic fluxes. For single speed three phase motors, the maximum winding factor is obtained by limiting the electrical angle of the phase belts to a 60° span. Under certain conditions it is desirable to avoid one or a few EMF or MMF harmonics. When this is the case, the winding is to be laid out with respect to this specific harmonic or these specific harmonics.

It was disclosed in a book entitled "Winding Alternating Current Machines" by Michael Liwschitz-Garik, published in 1950 by D. van Norstrand and Company, two methods of avoiding a specific harmonic or specific harmonics. The first method described a cycle shift of coils from phase to phase within the same repeatable winding part and the second means provided for shifting repeatable winding parts with respect to each other. By implementing the shift of coils from one phase to the other within the same repeatable part, the electrical angle of the phase belts were generally expanded beyond the traditional 60° span.

In dynamoelectric machines having PAM windings it is the general practice as disclosed in the above referenced patents to reduce some of the unwanted harmonics by cording the windings. In the case of salient pole machines, U.S. Pat. No. 3,450,971 provides a polyphase, synchronous, alternating current rotary electric machine having a pole amplitude modulated, pole changing, alternating current armature winding that provides a first and second alternative pole number and a pole changing direct current, salient pole, field system, in which the field system provides a fundamental field magnetic flux at the first and second alternative pole numbers together with a harmonic flux for at least one of either the first or the second pole numbers and the armature winding is of such a form that the winding factor for each phase winding thereof is low with respect to the EMF's generated therein by the field harmonic flux. The armature winding in the salient pole field system is designed in combination with each other so that the design of the armature winding is such as to inhibit currents therein due to field flux harmonics which arise from the compromise of the salient pole field system designs that are to be found in the field wave form.

As stated above, this disclosure covers a method of reducing a specific harmonic by varying the electrical angle of the phase belts with only a minor reduction in the winding constant of the main waves or wave and thus improving the overall performance of the motor. The electrical angle of the phase belts of pole amplitude modulation windings has traditionally been limited to 120°. It has been found that a judicious selection of the coils outside of this limit can normally produce large reductions for any specific harmonic without greatly reducing the main wave winding factors. The selection of the coils varies greatly with the original winding to be improved and the harmonic to be suppressed.

Disclosed are specific examples of machines having phase belts with electrical angles beyond the traditional angle of 120° among which is an 8/10 pole PAM motor designed with 120 slots having a phase belt with an electrical angle of 108° when connected in the 8 pole mode of operation and a phase belt of 180° when connected in the 10 pole mode of operation. The phase belts' electrical angle expansion techniques as will be disclosed below reduced the 14 pole harmonic from 22% to 0.2% while the winding factors were reduced from 0.7527 to 0.7449 for the 8 pole mode operation and from 0.825 to 0.7140 for the 10 pole mode of operation. An alternate solution for reducing the 14 pole harmonic through the use of phase belts' electrical angle expansion was disclosed and found to reduce the 14 pole harmonic down to 3.2% but only changing the winding factors to the more acceptable 0.7629 for the 8 pole connection and 0.7560 for the 10 pole connection. In addition, examples are disclosed that provide 8 pole/10 pole 144 slot machines. One embodiment reduced a 22% 14 pole harmonic to 0% while the winding factors for the 8 pole connection changed from 0.7476 to 0.7476 and the 10 pole connection changed from 0.8246 to 0.7185. An alternate embodiment was also disclosed in which the 14 pole harmonic was reduced from 22% to 8.6% and the winding factors for the pole connection were changed to 0.75771 and the 10 pole connector has a winding factor of 0.7713.

Another embodiment of the 144 slot machine is also provided in which the 14 pole harmonic was reduced to 6.3% while the 10 pole winding factor was only reduced to 0.7412.

BRIEF DESCRIPTION OF THE DRAWINGS

In order that the invention may be readily carried into practice, a number of embodiments thereof will now be described in detail, by way of example, with reference to the accompanying drawings, in which.

DESCRIPTION OF THE PREFERRED EMBODIMENT

The method of pole changing by pole amplitude modulation is fully explained in the preceding cited references.

By way of additional explanation of the pole changing method, trigonometric equations will now be given representative of the two basic operations, first creating two new pole numbers then eliminating one.

The space distribution of the magnetic fields of the phase windings A, B and C of a three phase machine are representatively given by:

$$B\theta_1 = A_1 \sin p\theta \qquad 1$$
$$B\theta_2 = A_2 \sin (p\theta - \frac{2\pi}{3})$$
$$B\theta_3 = A_3 \sin (p\theta - \frac{4\pi}{3})$$

where A is the pole amplitude.

Suppose that the pole amplitude A is phase modulated, for the three phase windings respectively, accordingly the three space modulation waves:

$$A_1 = M \sin k\theta$$
$$A_2 = M \sin (k\theta - \alpha)$$
$$A_3 = M \sin (k\theta - 2\alpha) \qquad 2$$

wherein M is a modulation wave amplitude.

Combining the two above equations leads to the following expressions for the magnetic fields of the three phase windings:

$$B\theta_1 = \frac{M}{2} [\cos (p-k)\theta - \cos (p+k)\theta] \qquad 3$$

$$B\theta_2 = \frac{M}{2} \left[ \cos [(p-k)\theta - \frac{2\pi}{3} + \alpha] - \cos [(p+k)\theta - \frac{2\pi}{3} - \alpha] \right]$$

$$B\theta_3 = \frac{M}{2} \left[ \cos [(p-k)\theta - \frac{4\pi}{3} + 2\alpha] - \cos [(p+k)\theta - \frac{4\pi}{3} - 2\alpha] \right]$$

If $\alpha = +2\pi/3$, the first term in these three expressions are all cophasal, and the second terms are spaced by $4\pi/3$, together forming a a three phase magnetic field of $(p+k)$ pole pairs. This causes the number of pole pairs to be increased by k on modulations.

If $\alpha = -2\pi/3$, the second term in these three expressions are all cophasal, and the first terms are spaced by $\alpha = -4\pi/3$ together forming a three phase magnetic field of $(p-k)$ pole pairs. This causes the number of pole pairs to be decreased by k on modulations. ($\alpha$ is measured on the scale of $k\theta$, the scale of the modulation wave.)

If the phase sequence in the sense in which is positive and represented by Equation 3 and A, B and C, then the value $\alpha =$ to $+2\pi/3$ corresponds to the phase origin sequence A, B, and C and the value $\alpha = -2\pi/3$ corresponds to the phase origin sequence A, C and B.

Any pole combinations of p1/p2 poles, of which one is an unmodulated pole number and the other a modulated pole number, can thus be obtained in either of the two ways. The winding can either be wound originally for p1 poles, either as an integral slot winding or as a fractional slot winding, and then modulated to p2 poles; or it can be wound for p2 poles and modulated to p1 poles.

In general, the best overall performance is given when the number of poles is reduced on modulation; and this arrangement is usually preferred. When the maximum output is desired at the higher speed, regardless of the reduction of output at the lower speed, it is then better to use modulations to increase the pole number and reduce the speed. However, when the latter mode of operation is performed, noise can be a problem.

In the situation where noise is a problem and the noise can be traced to a specific harmonic, it is possible to reduce that specific harmonic content of the MMF wave by expanding the electrical angle of the phase belts, which will be demonstrated below and the method for implementing phase belt expansion will be described in detail.

Figure 1:
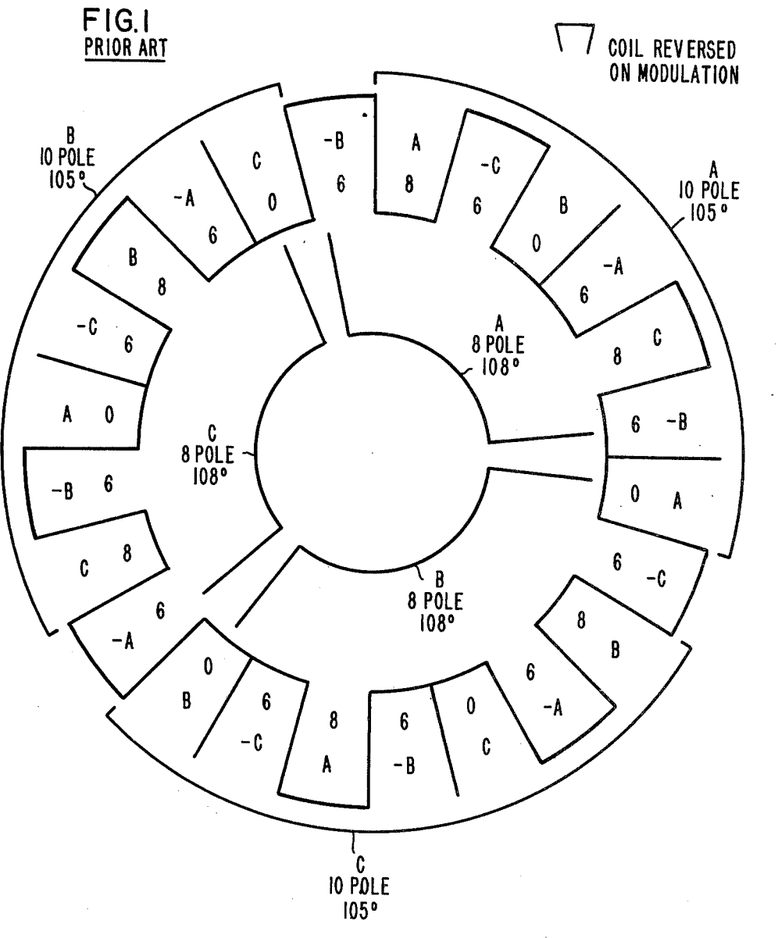
FIG. 1 is a clock diagram showing a three phase winding for an 8 pole/10 pole prior art type 120 slot machine with the electrical angle for the phase belts shown.

FIG. 1 is a clock diagram that shows a three phase PAM winding laid out to provide an 8 pole/10 pole speed changing dynamoelectric machine. As can be seen from the diagram, the phase belt sequence is +A, −C, +B, −A, +C, −B. The coil grouping assigned to each phase belt appears under the phase belt's letters. For example, in a clockwise sequence beginning at 12 o'clock on the diagram, the first A phase belt has eight coils, −C has six coils, B has zero coils, −A has six coils, C has eight coils, −B has six coils, etc. The phase belts and coil groups that are covered represent those coils in which the current flow is reversed on modulation. Within the inner periphery of the clock diagram, the electrical angle of the phase belts for each phase of the machine during 8 pole operation is shown and on the outer periphery of the clock diagram the electrical angle of the phase belts for 10 pole operation is shown. As can be seen from the diagram, under the 8 pole operation of the machine the phase belts for each phase have an electrical angle of 108° and the 10 pole phase belts have an electrical angle of 105°.

that of 0.8259 of the machine of FIG. 1. However, there was an improvement on the main pole winding factor for the 8 pole winding.

Figure 5:
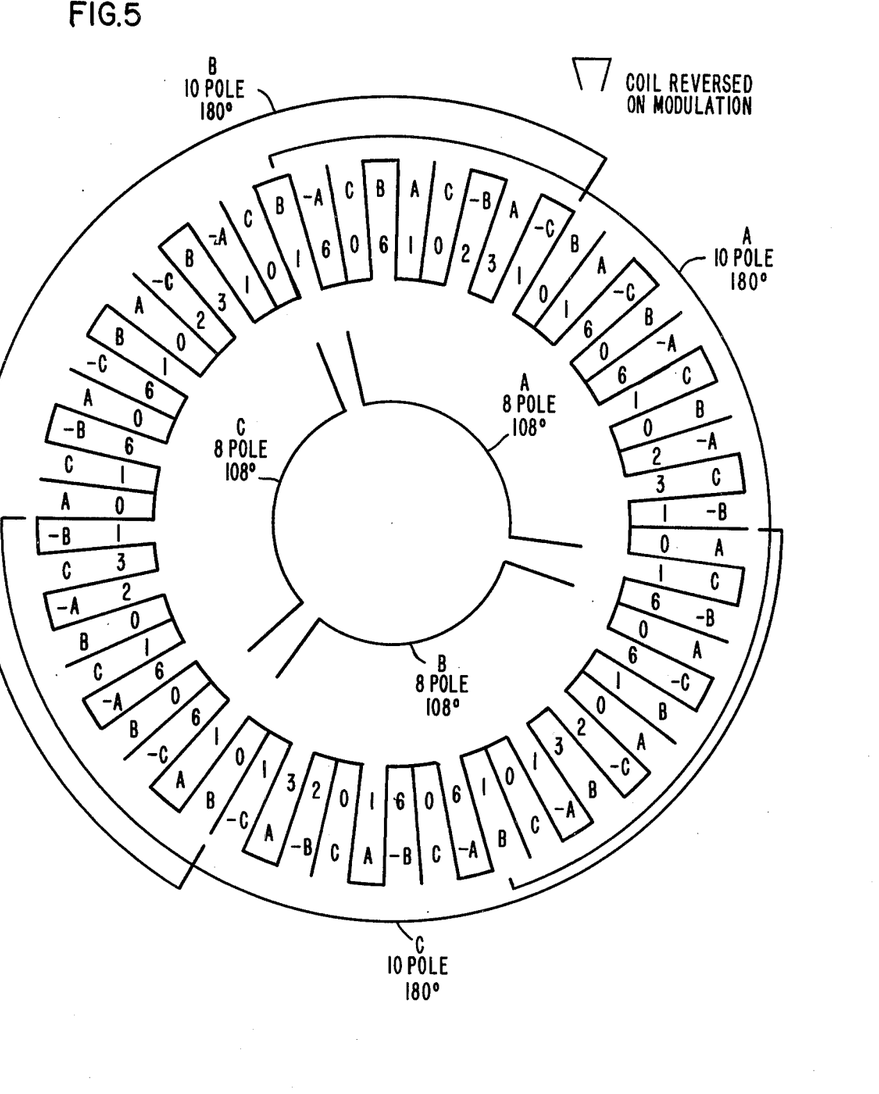
FIG. 5 is a clock diagram showing another embodiment of a three phase winding for an 8 pole/10 pole 120 slot machine with modified phase belts.

It has been found that by increasing the electrical angle of the phase belts even further, say up to 180°, a specific unwanted harmonic, such as the previously noted 14 pole harmonic can be drastically reduced, as shown in FIG. 5. The 14 pole harmonic according to Table 1 was reduced to 0.2% with a main pole winding factor of 0.7140. Thus, it can be seen that there is a trade-off to be made when implementing the expanding of the phase belts' electrical angle where unwanted harmonics may be eliminated; however, there may be a cost of a change in the main pole winding factor, which in the case of FIG. 5, was substantially reduced from that of the winding factor of the machine of FIG. 1.

Figure 7:
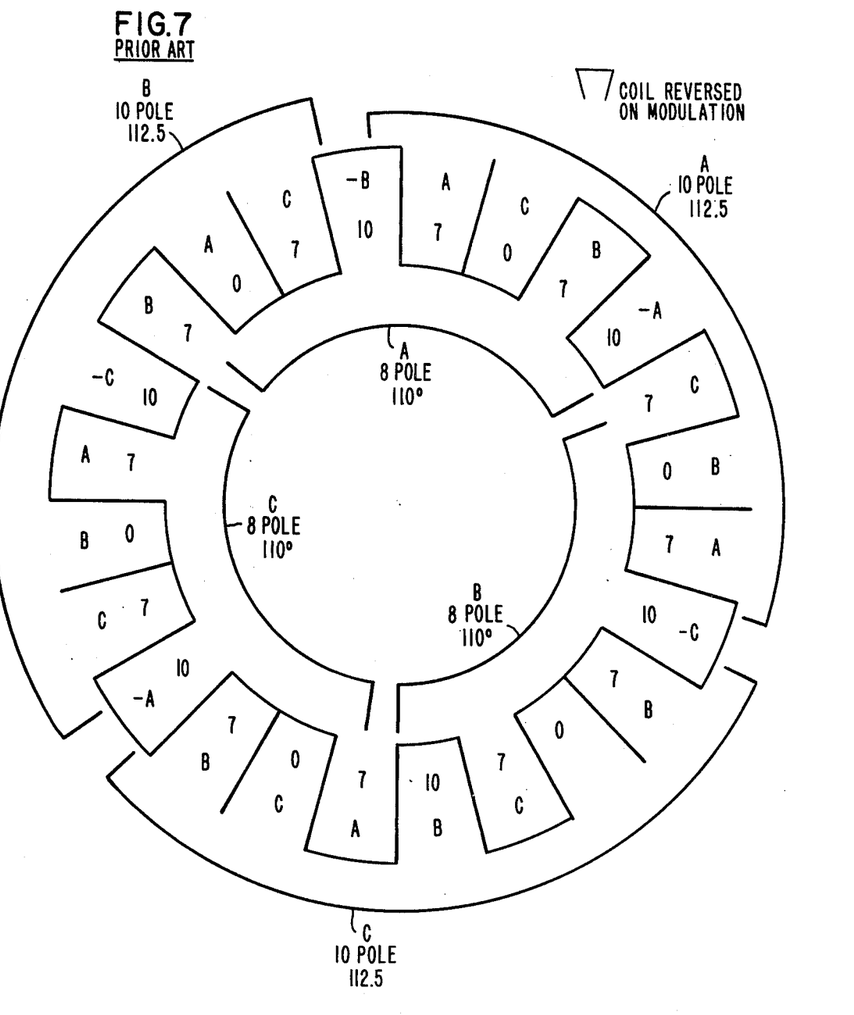
FIG. 7 is a clock diagram showing a three phase winding for an 8 pole/10 pole prior art type 144 slot machine with the electrical angles for the phase belts shown.
Figure 8:
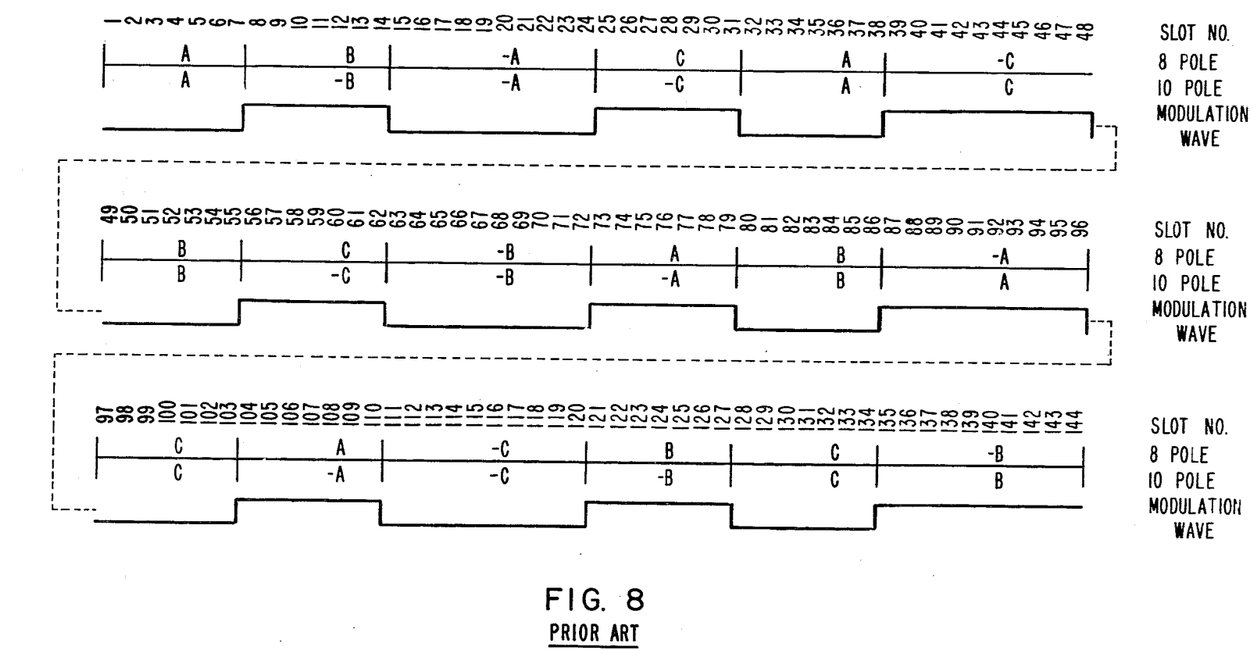
FIG. 8 is a slot diagram of the machine of FIG. 7 showing the 8 pole unmodulated arrangement, 10 pole modulated arrangement and the modulation waves.
Figure 9:
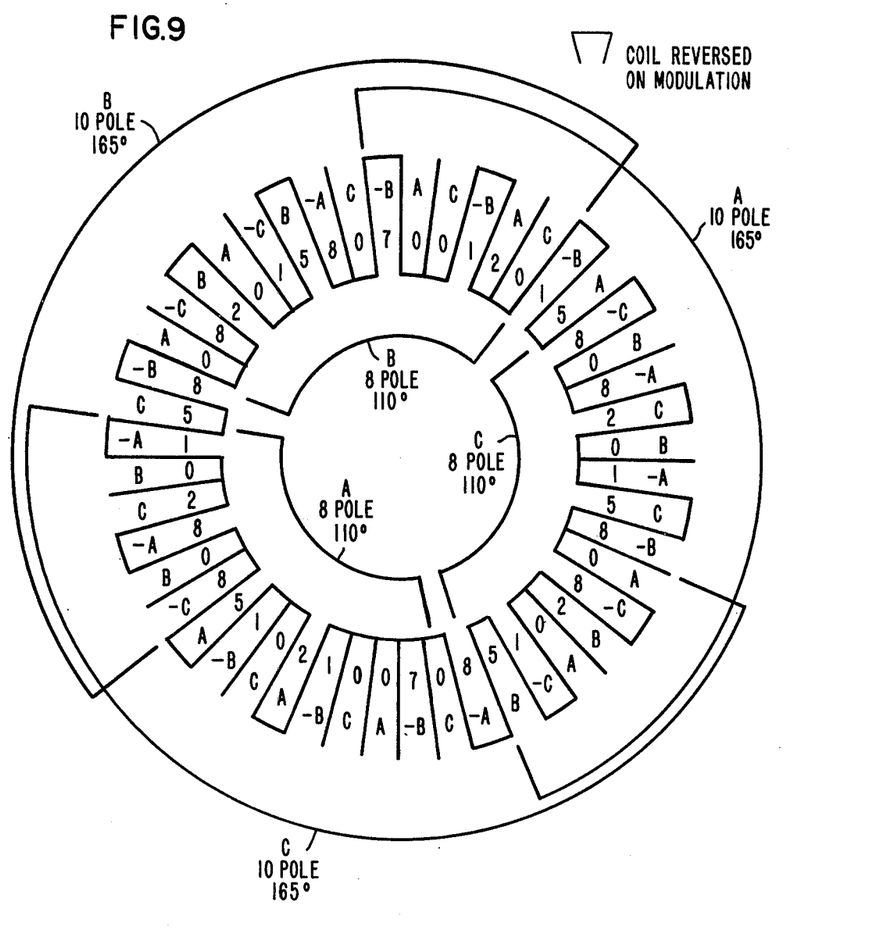
FIG. 9 is a clock diagram showing one embodiment of a three phase winding for an 8 pole/10 pole 144 slot machine with modified phase belts.
Figure 10:
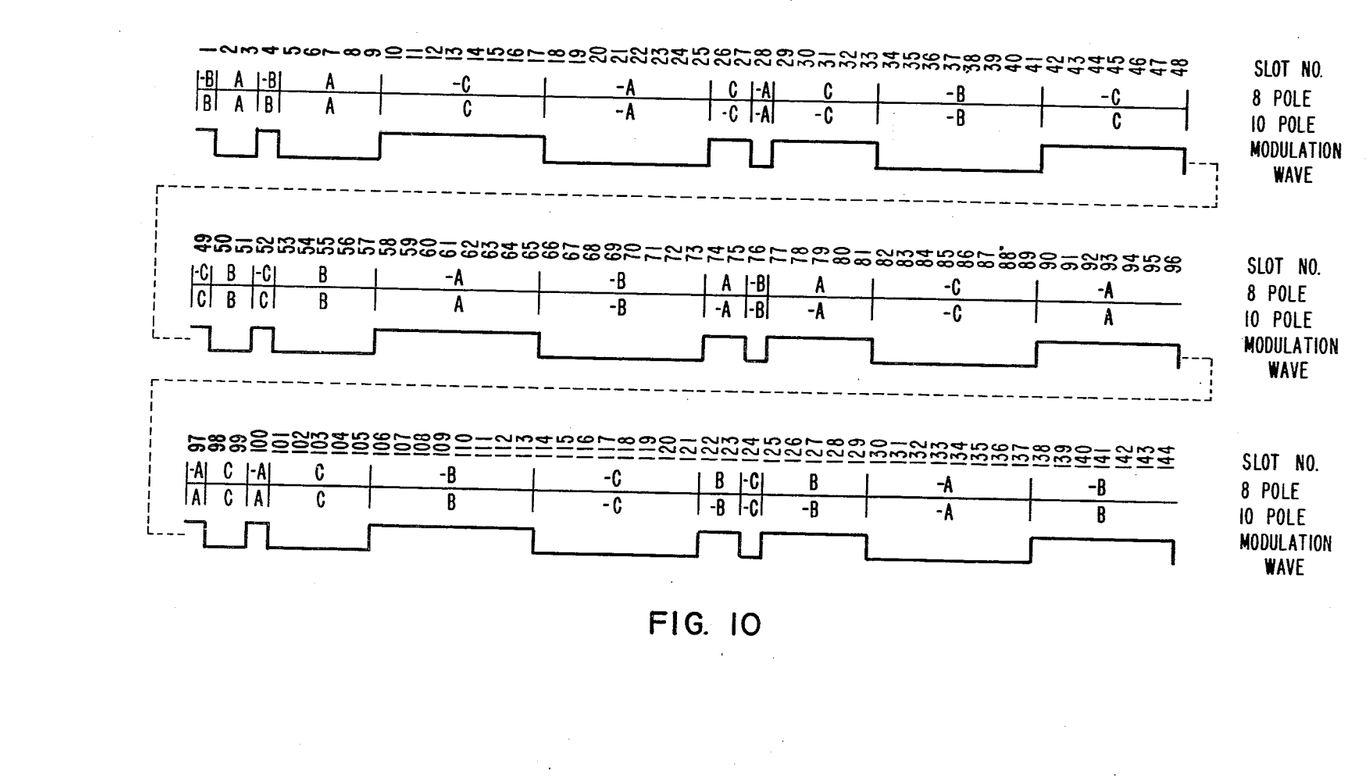
FIG. 10 is a slot diagram of the machine of FIG. 9 showing the 8 pole unmodulated arrangement, the 10 pole modulated arrangement and the modulation wave.
Figure 11:
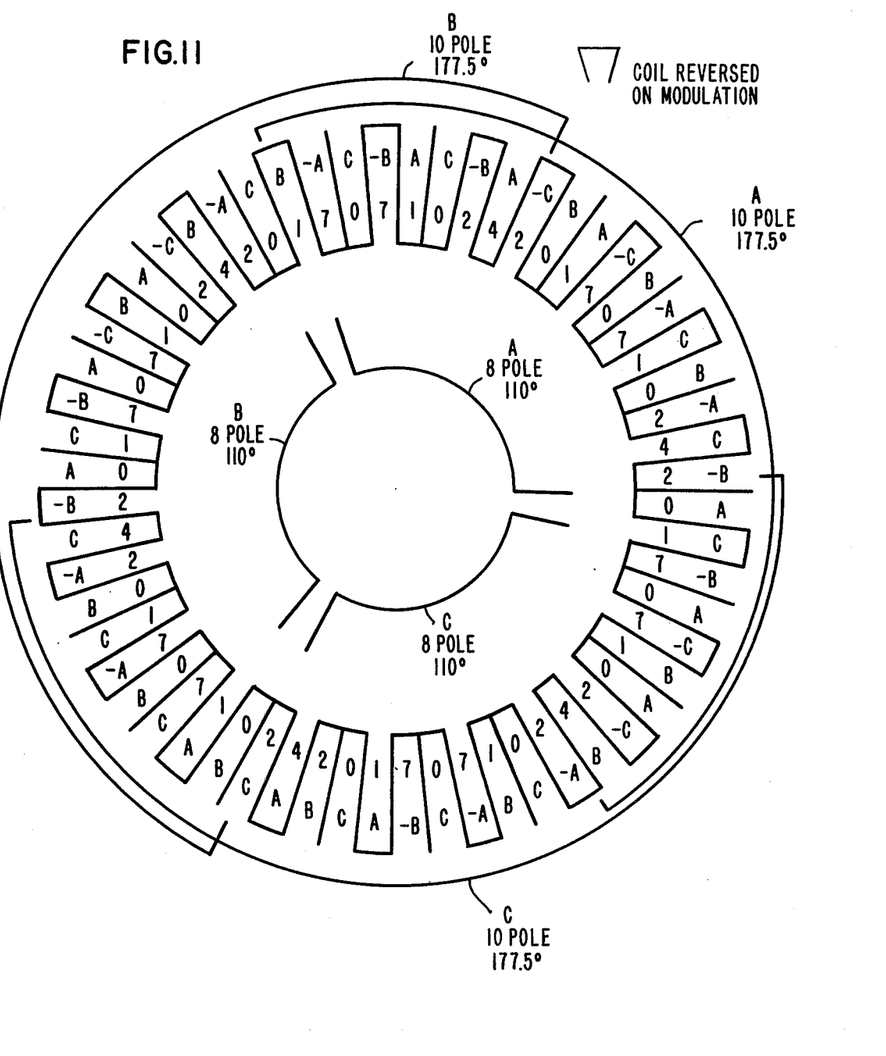
FIG. 11 is a clock diagram showing another embodiment of a three phase winding for an 8 pole/10 pole 144 slot machine with modified phase belts.

Other examples of the use of the phase belts' electrical angle expansion to reduce unwanted harmonics are provided in FIGS. 7 through 12. FIG. 7 is a clock diagram of a prior art type machine which, according to Table 1, had an unwanted 14 pole harmonic of 22%. By increasing the phase belts' electrical angle to 165° in the 10 pole mode of operation as shown in FIG. 9, the 14 pole harmonic was reduced to 8.6%; and the 10 pole winding factor went from 0.8246 to 0.7713. In FIG. 11 the unwanted 14 pole harmonic was essentially reduced

TABLE 1

|  | 120 Slot Machine | | | 144 Slot Machine | | | |
| --- | --- | --- | --- | --- | --- | --- | --- |
| Machine represented by Figures | 1 and 2 | 3 and 4 | 5 and 6 | 7 and 8 | 9 and 10 | 11 and 12 | 13 and 14 |
| Coil Pitch | 1 and 11 | 1 and 11 | 1 and 11 | 1 and 13 | 1 and 13 | 1 and 13 | 1 and 13 |
| Main Pole Winding Factor, 8 pole/10 pole | .7527/.8259 | .7629/.7560 | .7449/.7140 | .7476/.8246 | .7577/.7713 | .7476/.7185 | .7452/.7412 |
| Main Pole Distribution Factor, 8 pole/10 pole | .8692/.8550 | .8809/.7827 | .8602/.7392 | .8633/.8536 | .8750/.7985 | .8633/.7438 | .8605/.7673 |
| Main Pole Pitch Factor, 8 pole/10 pole | .8660/.9659 | .8660/.9569 | .8660/.9659 | .8660/.9659 | .8660/.9659 | .8660/.9659 | .8660/.9659 |
| % of Harmonic Content of MMF Wave when Compared to Main Wave | | | | | | | |
| 10 pole 2 pole | −10.5 | −53.2 | −55.8 | −6.2 | −40.8 | −55.2 | −42.1 |
| 8 pole 4 pole | −35.3 | −21.2 | −22.6 | −37.4 | −25.2 | −21.6 | −26.2 |
| 8 pole 8 pole | 100 | 100 | 100 | 100 | 100 | 100 | 100 |
| 10 pole 10 pole | 100 | 100 | 100 | 100 | 100 | 100 | 100 |
| 10 pole 14 pole | −20.7 | −3.2 | −0.2 | −22 | −8.6 | −0.0 | −6.3 |
| 8 pole 16 pole | −3.8 | −11.6 | −12.4 | −3.1 | −9.3 | −12.6 | −10.0 |

Table 1 provides the coil pitch, the main pole winding factor, main pole distribution factor, the main pole pitch factor, and a percentage of harmonic content of the MMF wave when compared to the main wave of the machine. The negative signs denote that the direction of rotation is opposite to that of the main wave. In the case of the examples of FIGS. 1 and 2, Table 1 shows that the machine has a coil pitch of 1 and 11, a main pole winding factor for the 8 pole mode of 0.7527, and for the 10 pole mode 0.8259. Table 1 also shows that under 10 pole operation there is a 20.7% (14) pole harmonic present in the MMF wave.

Figure 3:
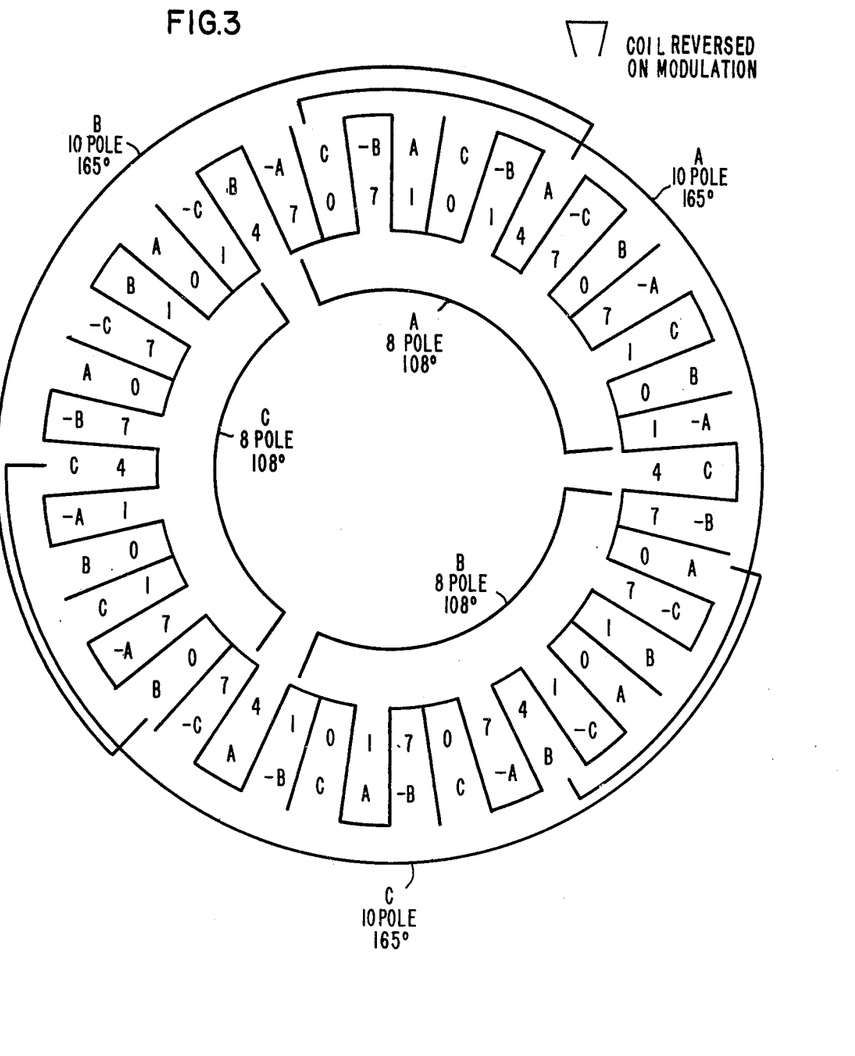
FIG. 3 is a clock diagram of one embodiment of the invention showing a three phase winding for an 8 pole/10 pole 120 slot machine with the modified phase belts.

FIG. 3 is a clock diagram of a machine very similar to that of FIG. 1 in that it is an 8 pole/10 pole, speed changing PAM machine which has under the 8 pole mode of operation phase belts with an electrical angle of 108°. However, under 10 pole operation the phase belt's electrical angle is expanded beyond the traditional angle of 120° to an angle of 165°.

Figure 2:
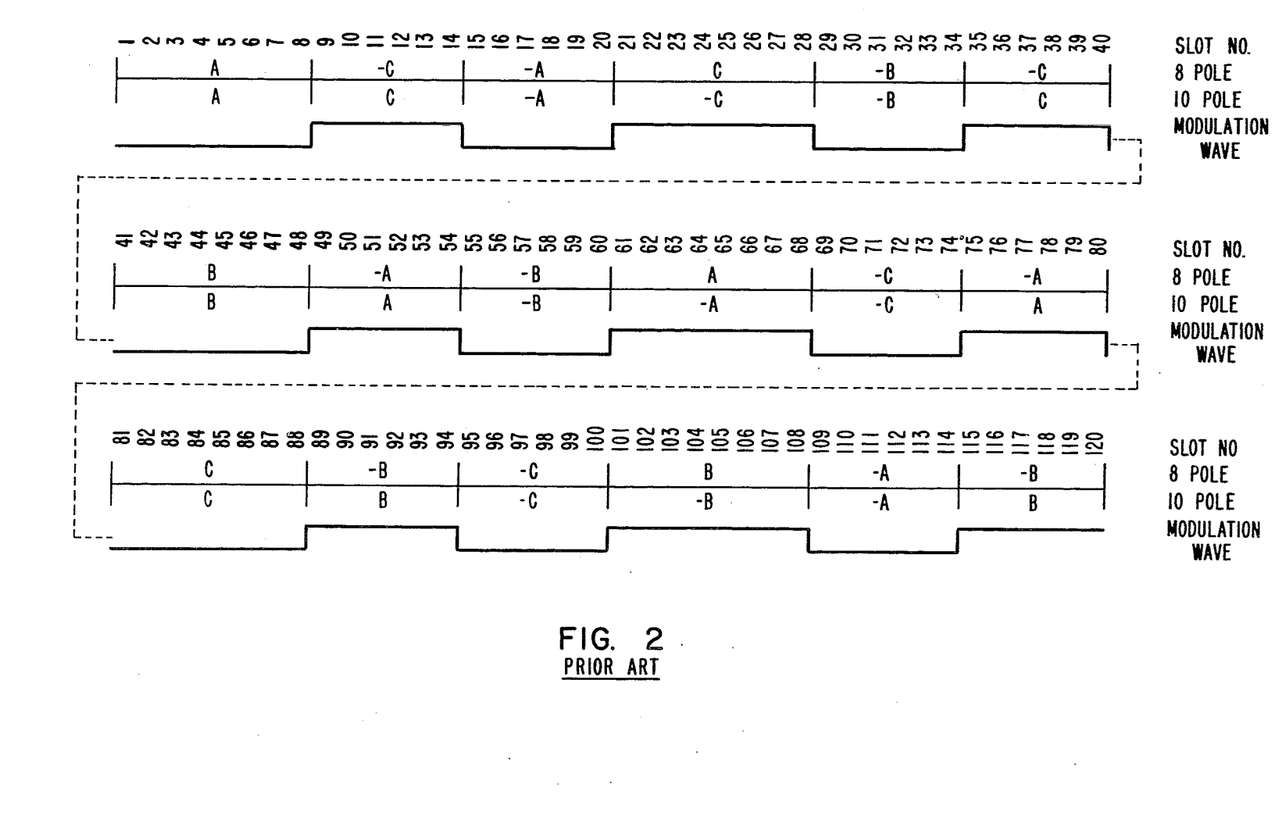
FIG. 2 is a slot diagram of the machine of FIG. 1 showing the 8 pole unmodulated phase belt arrangement, 10 pole modulated phase belt arrangement and the modulation wave.
Figure 4:
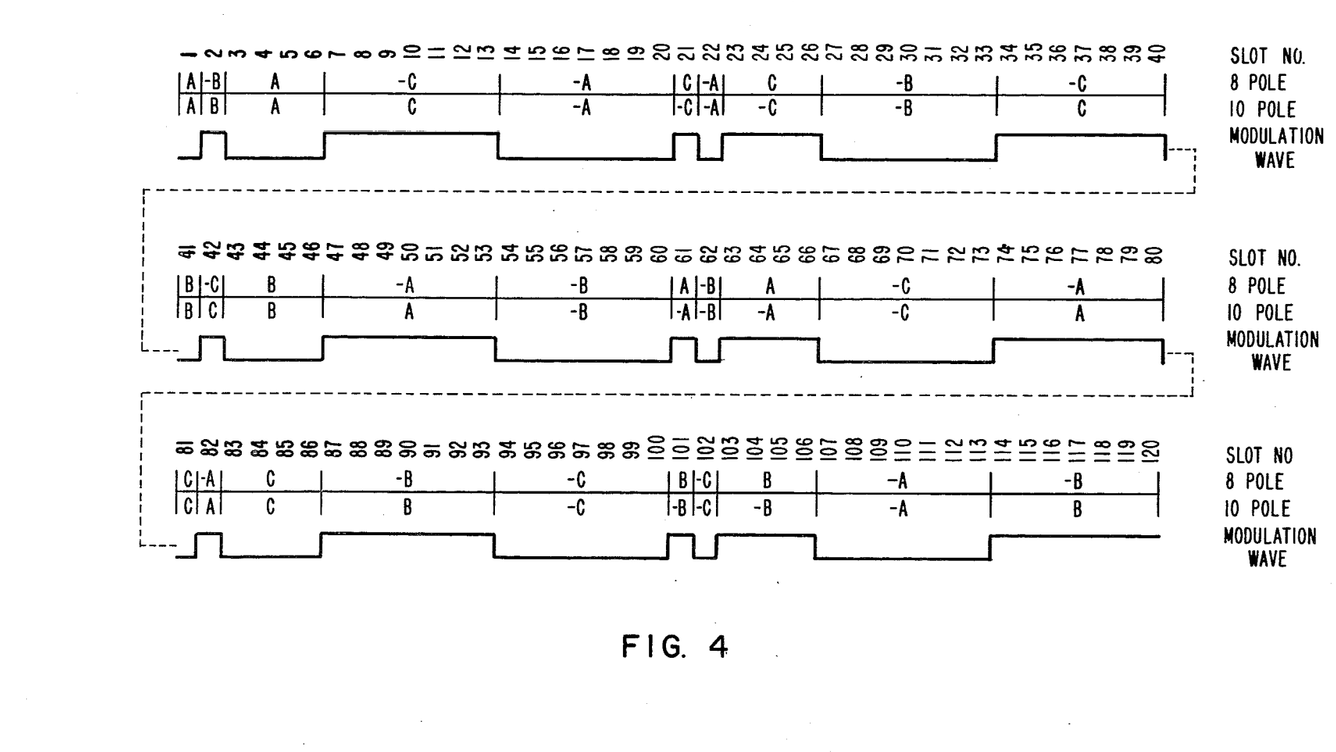
FIG. 4 is the slot diagram of the machine of FIG. 3 showing the 8 pole unmodulated arrangement, the 10 pole modulated arrangement and the modulation wave.
Figure 13:
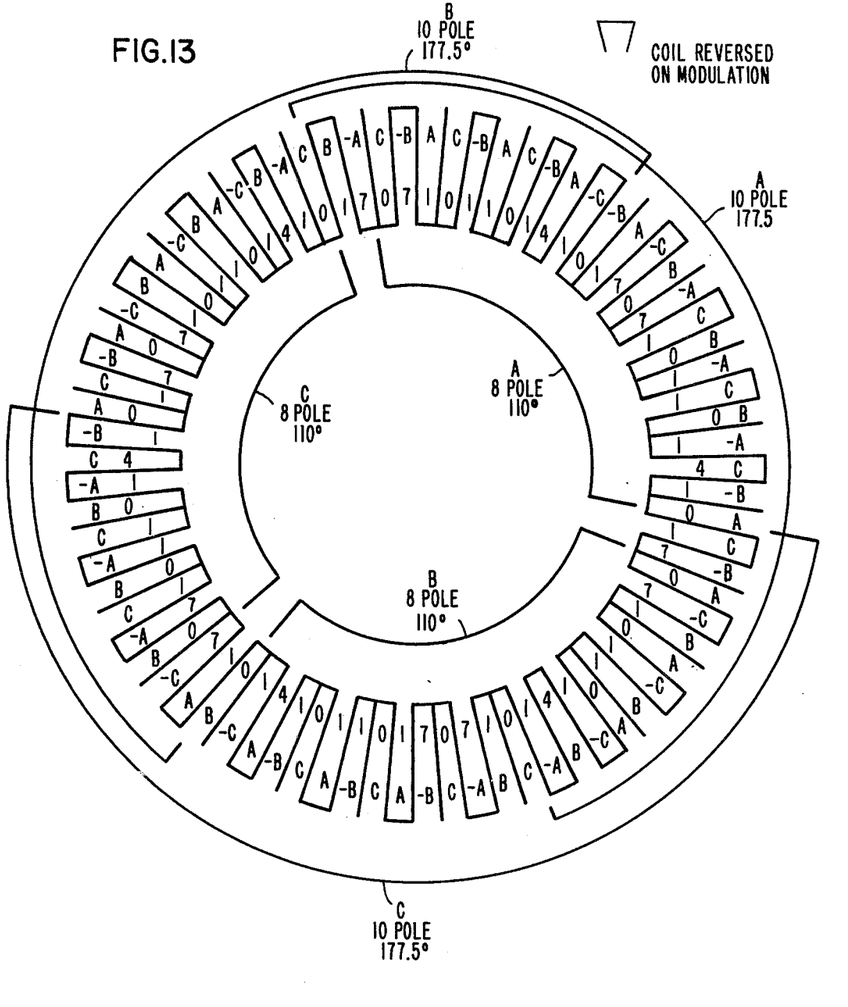
FIGS. 13 and 14 are respectively a clock diagram and a slot diagram of another embodiment of this invention.

Referring to Table 1, it can be seen that the 14 pole harmonic of the machine of FIGS. 3 and 4 has been reduced to 3.2% from the 20.7% of that of the machine in FIGS. 1 and 2 with a cost of reducing main pole winding factor for the 10 pole operation to 0.7560 from to zero at a cost of reducing the 10 pole winding factor from 0.8246 to 0.7185. While FIG. 13 is a compromise version with a 6.3% 14 pole harmonic and a 10 pole winding factor of .7412. It can be seen from the examples presented that expanding the electrical angle of the phase belts is an effective means of reducing or eliminating a specific harmonic; however, it has been pointed out that in some cases there may be an undesirable reduction of the main pole winding factor. This trade-off requires a decision as to what is the minimum acceptable winding factor for the application of the machine versus the degree of in the reduction of the unwanted harmonic.

THE METHOD OF PHASE BELT EXPANSION

In general, the conductors of one phase were generally distributed in more than one slot per pole, as is shown in FIGS. 1 through 14. The group of conductors for one phase at a pole is referred to a phase belt; and the corresponding group of whole coils as a coil group.

It is known that the winding factor is equal to the distribution factor times the pitch factor. In implementing phase belt expansion as pointed out earlier, it is desirable to keep the winding factor at a large a value as is required for the application of the machine. Also, it is well known in the art that varying the pole pitch factor can be very effective in reducing some harmonics much more than the fundamental wave. Therefore, the first step, after performing the initial PAM winding layout, in the reduction of a specific harmonic is to choose the main pole pitch factor so that any unwanted harmonic is reduced to its minimum value. Examples of this method are provided in U.S. Pat. No. 4,028,572. Table 1 shows that the machines of FIGS. 1 through 6 have a main pole pitch factor of 1 and 11 and for the machines of FIGS. 7 through 14 the pole pitch factor is 1 and 13.

It is desirable and an essential requirement that the main pole winding factor be kept as large as possible. Given that the main pole winding factor is the product of the main pole distribution factor times the main pole pitch factor and the fact that the main pole pitch factor remains a constant, the main pole distribution factor is the variable in which the optimization of the design is implemented. The main pole distribution factor is given as the quotient of $(\sin (\pi/2m))/(n \sin (\pi/2mm))$, where m is the number of phase belts per pole and n is is the number of coils per phase belt.

The second step in implementing phase belt's electrical angle expansion is to select an acceptable value for the main pole winding factor, and thus the main pole distribution factor that is acceptable. After determining the minimum value for the distribution factor that is acceptable, increase the number of phase belts per pole and decrease the number of coils per phase belt to obtain the distribution factor. For example in FIG. 1 there was a total of 8 phase belts per phase and the number of coils per group was 8, 6, and 0. In FIG. 3 the number of phase belts was increased to 14 per phase and the number of coils per group were 0, 1, 4 and 7. The addition of the number of phase belts resulted in the phase belts' electrical angle being expanded from 105° to 165°, which is beyond the traditional range for pole amplitude modulated motors of 120°.

In FIG. 5 to expand the phase belts' electrical angle to 180° required an increase in the number of phase belts per phase to 20 with the number of coils per phase belt being 0, 1, 2, 3, and 6.

Similarly, FIG. 7 has 8 phase belts per phase with the number of coils per phase belt being 0, 7, and 10. In FIG. 9, the number of phase belts required to achieve total phase belts' electrical angle of 165° was 16 and the number of coils per group was 0, 1, 2, 5, and 8. FIG. 11 is similar to FIG. 5 in that there is a total number of 20 phase belts per phase but the number of coils per phase belt is 0, 1, 2, 4, and 7. There are 26 phase belts per phase for FIG. 13 and the number of coils per group is 0, 1, 4 and 7.

The next step in eliminating a specific harmonic is to select the coils or group of coils for distribution among the increased number of phase belts and to insure that a specific harmonic is suppressed. FIG. 2 is the slot diagram of the machine of FIG. 1 and is divided up to represent 120 mechanical degrees per line—that is, for a 120 slot machine, the first line covers 40 slots; the second line covers the second 40 slots; and the third line covers the remaining 40 slots of the 120 slots of the machine. The 8 pole connection is shown directly under the slot numbers; the 10 pole connection is shown under the 8 pole connection and beneath the 10 pole layout is the modulation wave. The modulation wave denotes those coils in which the current is reversed on modulation. This layout was chosen because it demonstrates the ease in which the phase belts' expansion can be implemented.

In expanding the phase belts' electrical angle, a systematic rotation of selected coils by 120° is required. For example, referring to FIG. 2, the first rotation should be moving the A coil in slot No. 1 to slot 41, moving the B coil assigned to slot 41 to slot 81 and moving the C coil of slot 81 to slot 1. The second step would be to move the C coil assigned to slot No. 1 to slot 41, the A coil assigned to slot 41 to slot 81, and the B coil assigned to slot 81 to slot 1. The next step would be returning the A coil to slot 1, the B coil to slot 41 and the C coil to slot 81 and moving the A coil for slot 2 to the slot 42, the B coil from slot 42 to slot 82 and the C coil from slot 82 to slot 2. This process would continue until all possible combinations of coil configurations have been achieved. That would be the one-third of the total slot numbers cubed or until the desired configuration has been achieved for the specific harmonic. The selected coil configuration that provides a reduction of the specific harmonic is the coil configuration in which the distribution factors for that specific harmonic is at its minimum value.

The movement of the coils can be defined by the permutation of the term $A_{mm}$ where A is the coil set that is to be rotated. A set is three coils that are located 120 mechanical degrees away from each other around the periphery of the machine, m is the slot of the coil set to be moved and n is the step that is to be performed.

When n is equal to 1 the coils of a set are rotated 120 mechanical degrees from the original layout. When n is equal to 2 coils of a set are rotated 120 mechanical degrees from the layout obtained when A step of n=1 was performed and n=3 returns the coils of a set to their original slot location.

The equation below shows the permutation taken through m slots where m represents all slot numbers from 1 to the total slot number of slots divided by 3.

The initial starting point of the permutation of the coils is not important.

| | | |
|---|---|---|
| A11 | | |
| A12 | | |
| A13, | A21 | |
| A12, | A21 | |
| A13, | A22 | |
| A11, | A22 | |
| A12, | A22 | |
| A13, | A23, | A31 |
| A11, | A23, | A31 |
| A12, | A23, | A31 |
| A13, | A21, | A31 |
| A11, | A21, | A31 |
| A12, | A21, | A31 |
| A13, | A22, | A31 |
| A13, | A22, | A31 |
| A13, | A22, | A31 |
| , | , | A32 |
| , | , | , |
| , | , | , |
| A13, | A23, | A33 $\cdots$ A$_{(m-1)3}$, A$_{m3}$ |

Using the above equation and referring to FIG. 4, we can see that FIG. 2 had the permutations performed on it that is represented by the equation:

$$A13, A27, A33 \rightarrow A(21)3, A(22)2.$$

Figure 6:
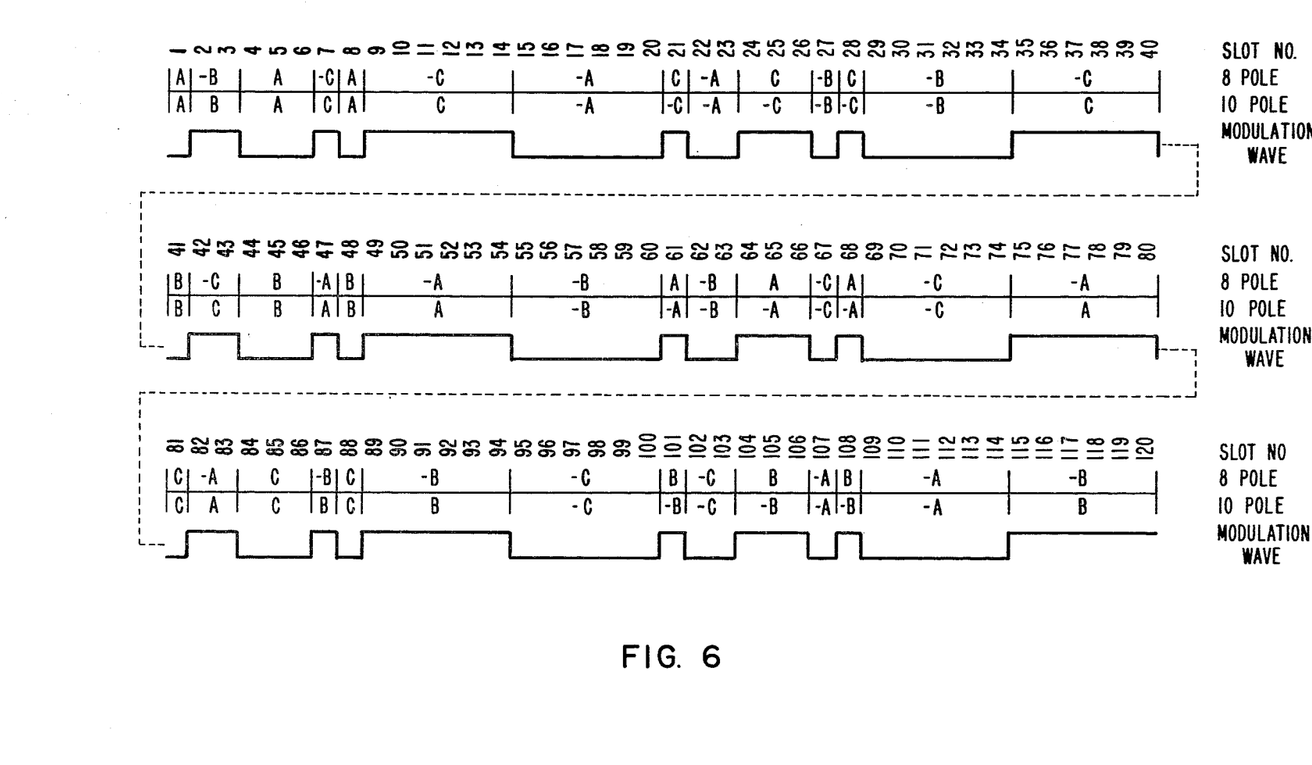
FIG. 6 is a slot diagram of the machine of FIG. 5 showing the 8 pole unmodulated arrangement, the 10 pole modulated arrangement and the modulation wave.

Likewise, the permutations for the coil configuration of FIG. 6 are given by the equation:

A13, A22, A32, A43, A53, A63, A73, A82,
A93,→A(21)3——A(22)2, A(23)2, A(24)3, A(25)3,
A(26)3, A(27)3, A(28)2.

Figure 12:
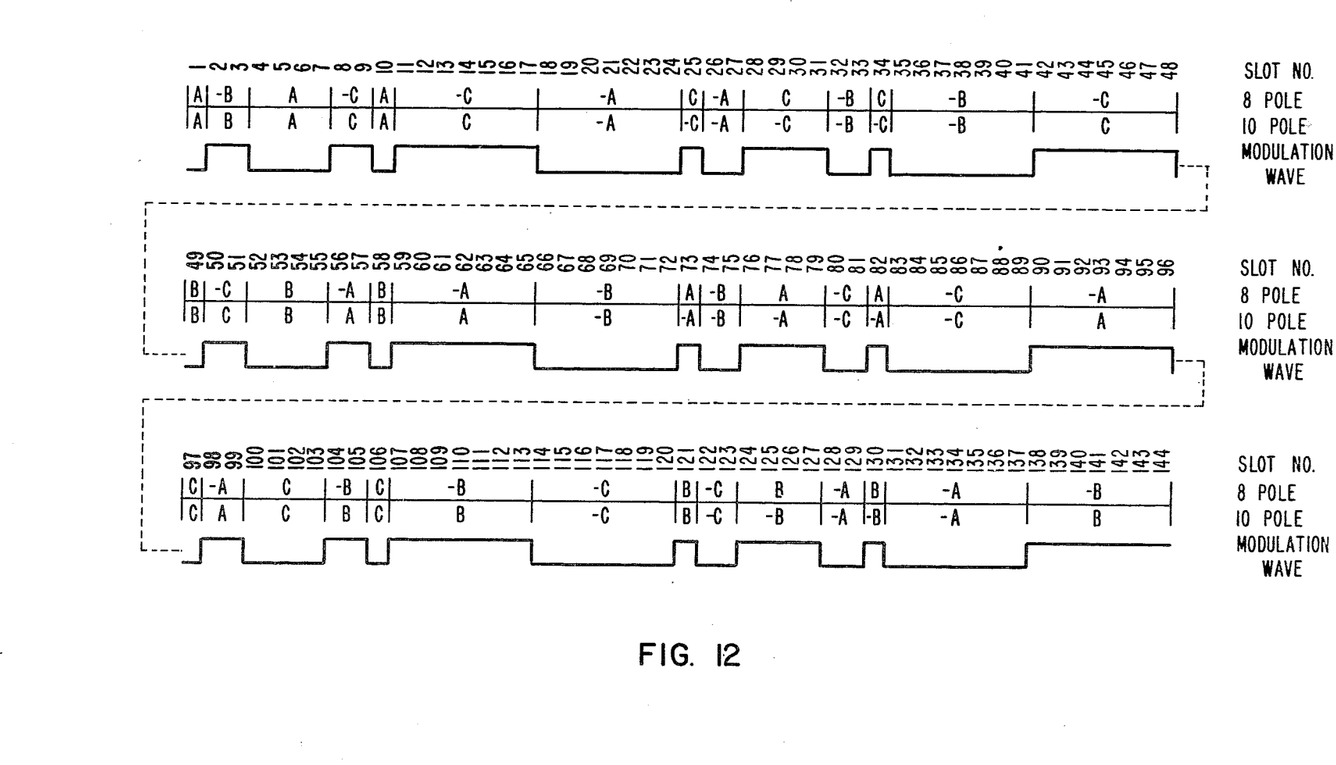
FIG. 12 is a slot diagram of the machine of FIG. 11 showing the 8 pole unmodulated arrangement, the 10 pole modulated arrangement and the modulation wave.

Similarly, the machine that is represented by the slot layout of FIG. 8 may be expanded through the method described above with the FIG. 10 being represented by:

A11, A21, A23, A42, A53, A63, A73, A81, A91, A(10)2
A(11)2, A12(2), A(13)2, A(14)2, A(15)1, A(16)1,
A(17)1 A(18)3→A(24)3, A(25)2, A(26)3, A(27)3,
A(28)2 A(29)3→A(31)3, A(32)1, A(33)1,
A(34)2→A(38)2,
A(39)1, A(40)1, A(41)1 and FIG. 12 is represented by:

A13, A22, A32, A43, A53, A63, A73, A82, A92, A(10)1,
A(11)2→A(14)2, A(15)1, A(16)1, A(17)1,
A(18)3→A(25)3, A(26)2

A(27)2, A(28)3→A(31)3, A(32)2, A(33)2, A(34)1,
A(35)2 A(38)2, A(39)1, A(40)1, A(41)1.

Figure 14:
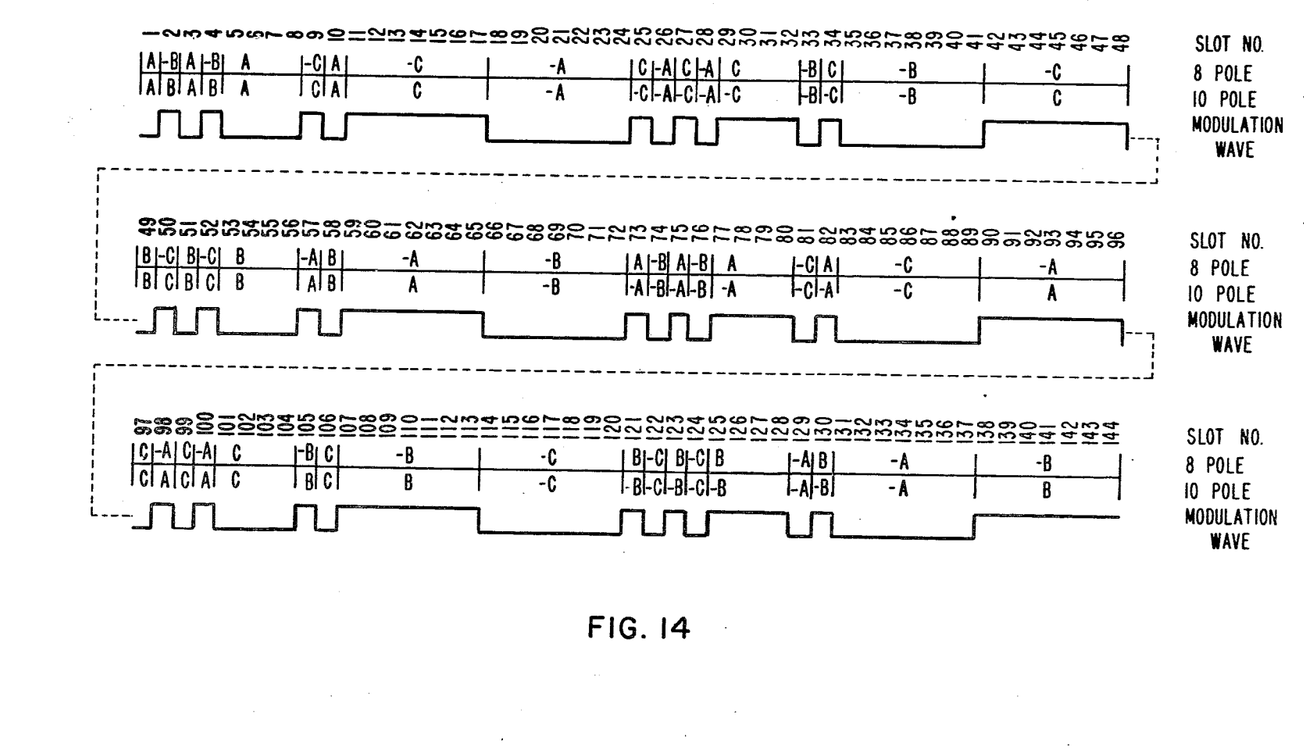

Finally, FIG. 14 is represented by:

A13, A22, A33, A42, A53, A63, A73, A81, A92, A(10),
A(11)2, A(12)2, A(13)2, A(14)2, A(15)1, A(16),
A(17)1, A(18)3→A(25)3, A(26)2, A(27)3 A(28)2,
A(29)3, A(30)3, A(31)3, A(32)1, A(33)2 A(34)1,
A(35)2, A(36)2, A(37)2, A(38)2, A(39)1, A(40)1,
A(41)1

After each step the distribution factor should be measured or calculated for the specific harmonic that is to be reduced and after each set the number of phase belts should be verified for not exceeding the maximum number necessary for providing an acceptable winding factor for the main poles.

In conclusion, it has been shown that by the increasing the number of phase belts per phase and thereby expanding the angle of the electrical field for each phase belt, it is possible to reduce a specific harmonic. The examples presented can be used to modify existing type machines in which there is a problem with an unwanted harmonic or can be utilized in the design of new machines. Although it is possible to implement this invention on the physical equipment itself to those skilled in the art it is obvious that phase belts electrical angle expansion can be carried out through laboratory simulations, analog computer techniques, or digital computers given the teachings of this invention.

I claim:

1. A rotary electric machine having a three phase alternating current winding adapted to provide alternative pole numbers by alternating modes of operation, said alternate current winding being arranged for operation in a normal, unmodulated, mode to provide p poles distributed among a plurality of phase belts having an electrical angle of $\delta$, which is less than 120° and in which, for all three phase windings, consecutive poles are arranged for operation in an alternative, modulated, mode in which, for one phase winding, at least part of one-half of the phase winding is reversed in polarity relative to the corresponding part of the other half of the same phase winding, whereby an amplitude modulated magnetomotive force field is established which combines a field component of p+2k poles and a field component of p−2k poles, where k is an integer and the second and third phase windings are, arranged to provide second and third amplitude modulated fields also combining a field component of p+2k poles and a field component of p−2k poles and an expanded electrical angle for said phase belts of $\beta$ greater than 120°.

2. The rotary electric machine as claimed in claim 1 wherein $\delta$ is less than 120° and $\beta$ is equal to 180°.

3. The rotary electric machine as claimed in claim 1 wherein $\delta$ is less than 120° and $\beta$ is equal to 165°.

4. The rotary electric machine according to claim 1 having said plurality of phase belts, p poles is equal to 8, said p−2k pole pairs is suppressed, and k is equal 1 and said p+2k pole pairs is distributed over said plurality of phase belts having an electrical angle greater than 120°.

5. The rotary electric machine according to claim 4 in which said plurality of the phase belts is equal to 14 and said electrical angle is equal to 165°.

6. The rotary electric machine according to claim 4 in which said plurality of phase belts is equal to 16 and said electrical angle is equal to 165°.

7. The rotary electric machine according to claim 4 in which said plurality of phase belts is 20 and said electrical angle is equal to 180°.

8. A method of suppressing of a specific harmonic by phase belt expansion of a pole amplitude modulated, speed-changing, rotary electric machine, comprising:
   selecting the minimum acceptable winding factor for said machine's application;
   selecting the number of phase belts and coils per group necessary to obtain said winding factor;
   rotating coils belonging to said coil groups through $A_{mm}$ permutation where A is a coil set that is to be rotated, a set being three coils that are located 120 mechanical degrees from each other around the periphery of said machine, m is the slot number of the coil to be moved and n is the step that is to be performed;
   measuring the distribution factor for each coil at said specific harmonic; and
   selecting the value of $A_{mm}$ that provides the selected number of phase belts with said coil groups having a minimum distribution factor for said specific harmonic.

9. The method according to claim 8 in which said steps further comprise:
   rotating said $A_m$ coils 120° when n is equal to 1;
   rotating said $A_m$ coils 120° from the position obtained after step 1 when n is equal to 2; and
   rotating said $A_m$ coils back to the position said $A_m$ coils were located prior to step 1 when n is equal to 3.

* * * * *